US011975563B2

(12) United States Patent
Moll et al.

(10) Patent No.: US 11,975,563 B2
(45) Date of Patent: May 7, 2024

(54) PATTERN MAKER

(71) Applicant: CRAYOLA LLC, Easton, PA (US)

(72) Inventors: Joseph Thomas Moll, Bethlehem, PA (US); Jennifer Kesilman, Bethlehem, PA (US); Gregory Nungester, Milford, NJ (US); Linda Smith, Freemansburg, PA (US)

(73) Assignee: CRAYOLA LLC, Easton, PA (US)

( * ) Notice: Subject to any disclaimer, the term of this patent is extended or adjusted under 35 U.S.C. 154(b) by 25 days.

(21) Appl. No.: 17/968,362

(22) Filed: Oct. 18, 2022

(65) Prior Publication Data

US 2023/0133300 A1 May 4, 2023

Related U.S. Application Data

(60) Provisional application No. 63/272,805, filed on Oct. 28, 2021.

(51) Int. Cl.

*B43L 13/00* (2006.01)
*B43L 11/00* (2006.01)
*B44D 2/00* (2006.01)

(52) U.S. Cl.

CPC .............. *B44D 2/002* (2013.01); *B43L 11/00* (2013.01); *B43L 13/00* (2013.01)

(58) Field of Classification Search

CPC ......... B44D 2/002; B44D 3/225; B43L 11/00; B43L 13/00; B43L 13/12

See application file for complete search history.

(56) References Cited

U.S. PATENT DOCUMENTS

| | | | | |
|---|---|---|---|---|
| 5,628,118 A * | 5/1997 | Rivera | .................... | B43L 7/005 33/565 |
| 6,011,084 A | 1/2000 | Leidner et al. | | |
| 7,171,864 B2 | 2/2007 | Schachter | | |
| 7,546,686 B1 * | 6/2009 | Norman | .................. | B43L 11/05 33/27.01 |
| 9,925,822 B2 * | 3/2018 | Chiu | ...................... | B43K 29/00 |
| 2009/0139099 A1 * | 6/2009 | Norman | .................. | B43L 11/05 33/27.01 |

(Continued)

FOREIGN PATENT DOCUMENTS

| | | | | |
|---|---|---|---|---|
| CN | 104442123 A * | 3/2015 | .............. | B43L 13/00 |
| CN | 104442123 B * | 6/2016 | .............. | B43L 13/00 |

OTHER PUBLICATIONS

Website Inventory listing for HUTT Multi-parameter testing machine ballpoint pen automatic mechanical Germany, LR Associates Inc, www.LARRYRAZZA.com; downloaded from the internet on Nov. 14, 2023 at https://www.larryrazza.com/listings/982316-used-hutt-multi-parameter-testing-machine-ballpoint-pen-automatic-mechanical-germany (3 pgs).

*Primary Examiner* — Yaritza Guadalupe-McCall
(74) *Attorney, Agent, or Firm* — STINSON LLP

(57) ABSTRACT

The present disclosure relates to a drawing device for creating a pattern, wherein the drawing device comprises a gear assembly that rotates upon movement of the device, the gear assembly being operatively coupled to a cam and a cam follower, such that rotation of the gear assembly rotates the cam and causes the cam to bear against the cam follower. Movement of the cam follower thereby causes lateral movement of a marker carriage housing at least one writing instrument.

20 Claims, 14 Drawing Sheets

(56) References Cited

U.S. PATENT DOCUMENTS

| | | | | |
|---|---|---|---|---|
| 2010/0095545 | A1* | 4/2010 | Miller | B43L 13/00 33/759 |
| 2012/0301200 | A1* | 11/2012 | Malone | B26F 1/3813 400/323 |
| 2016/0347110 | A1* | 12/2016 | Chiu | B43L 11/00 |
| 2022/0371358 | A1* | 11/2022 | Lin | B43L 13/022 |
| 2023/0133300 | A1* | 5/2023 | Moll | B43L 13/12 33/18.1 |

* cited by examiner

PATTERN MAKER

CROSS-REFERENCE TO RELATED APPLICATIONS

This application is based on and claims priority to U.S. Provisional Application Ser. No. 63/272,805, filed on Oct. 28, 2021, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The present disclosure relates to a drawing device for creating a pre-determined pattern on a substrate.

2. Description of Related Art

Creating patterns using markers or other writing instruments is typically completed by hand. Children may create patterns on paper sheets for home-made wrapping paper, birthday cards and the like. The present disclosure aids in pattern-making by streamlining the process and allowing a more uniform outcome.

BRIEF SUMMARY OF THE INVENTION

The present disclosure is directed to a drawing device comprising at least one wheel coupled to a wheel rod having a gear assembly located thereon, wherein movement of the wheel causes rotation of the gear assembly, a cam operatively coupled to the gear assembly such that rotation of the gear assembly causes rotation of the cam, wherein the cam has at least one bearing surface that defines a pattern to be drawn by the drawing device, the bearing surface configured to intermittently engage a cam follower upon rotation of the cam, at least one arm operatively coupled to the cam follower, wherein the at least one arm is configured to pivot upon engagement of the cam with the cam follower, a marker carriage operatively coupled to the at least one arm, wherein the marker carriage defines at least one marker opening sized and shaped to receive a writing instrument, and wherein the marker carriage is configured to laterally move upon pivoting of the at least one arm in the pattern defined by the bearing surface.

The present disclosure is further directed to a kit comprising the drawing device as described above, at least two cams, and at least one writing instrument, wherein the at least two cams each have a bearing surface configured to define a pattern to be drawn by the drawing device and wherein the bearing surface of the first cam is different from the bearing surface of the second cam to define two different patterns.

The present disclosure is also directed to a method of creating a pattern on a substrate, the method comprising inserting at least one writing instrument into a marker carriage of a drawing device, coupling a cam to the drawing device, pushing the device across the substrate, wherein the device comprises at least one wheel coupled to a wheel rod, and the pushing causes the at least one wheel and the wheel rod to rotate, wherein the device comprises a gear assembly and rotation of the at least one wheel causes rotation of the gear assembly; wherein the gear assembly is operatively coupled to the cam, such that rotation of the gear assembly causes rotation of the cam, wherein the cam has at least one bearing surface configured to intermittently bear against a cam follower upon rotation of the cam, wherein the device further comprises at least one arm operatively coupled to the cam follower, wherein the at least one arm is configured to pivot upon engagement of the cam with the cam follower, and wherein the marker carriage is operatively coupled to the at least one arm and the marker carriage is configured to laterally move upon pivoting of the at least one arm.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

Corresponding reference characters indicate corresponding parts throughout the drawings.

DETAILED DESCRIPTION OF PREFERRED EMBODIMENT

Figure 1:
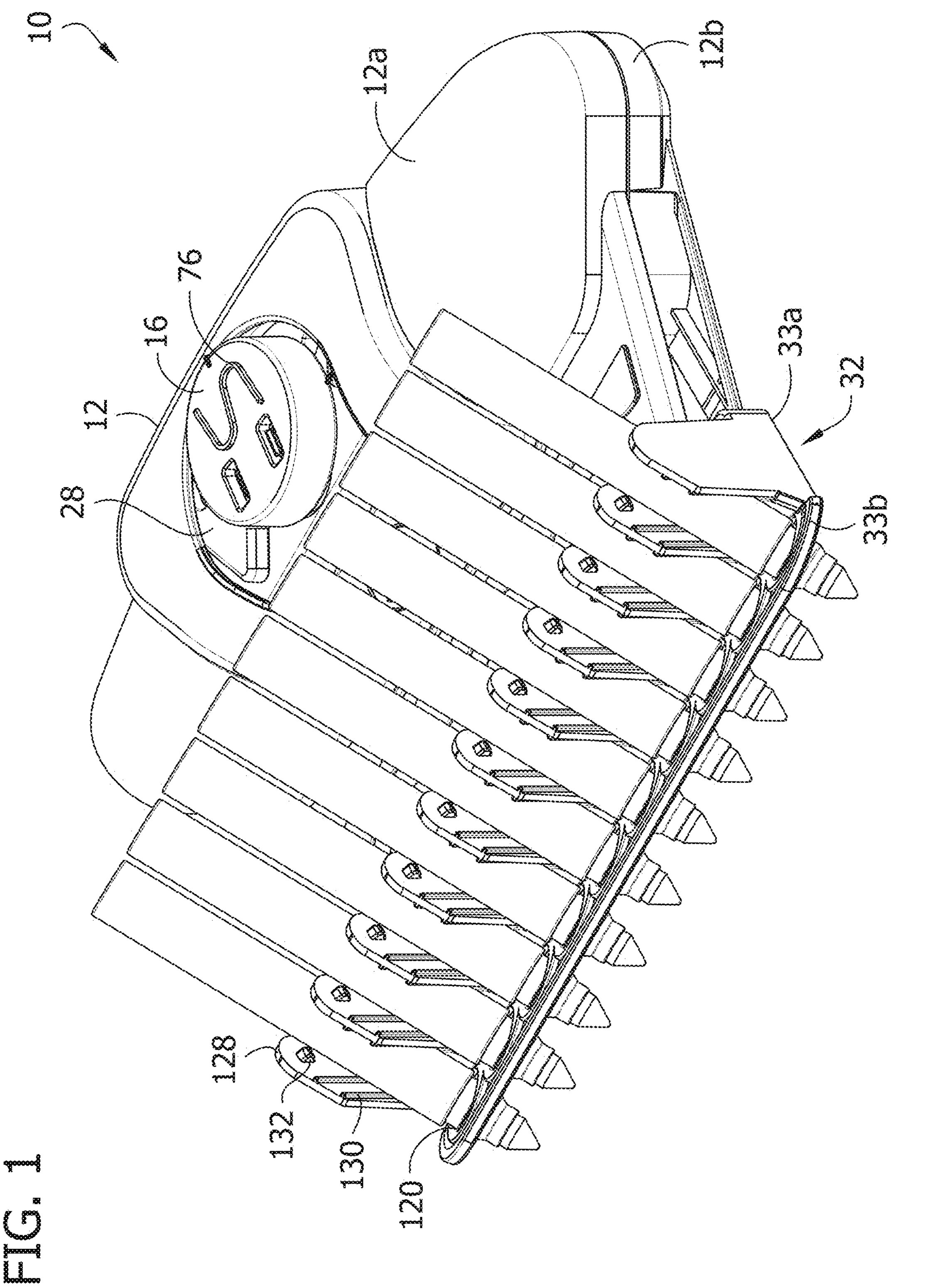
FIG. 1 is a perspective view of a drawing device in accordance with an embodiment of the invention showing markers and a cam mounted on the drawing device.

The present disclosure is generally directed to a drawing device. The drawing device is capable of creating patterns on a writing surface, particularly when the drawing device is pushed over the writing surface. Thus, the drawing device is capable of holding markers (or other appropriate writing instruments), and when the user pushes (or pulls or otherwise moves) the device over the writing surface (any sized writing surface), different line patterns are created. The patterns or designs created with this device can be used for a broad range of purposes, such as craft projects, wrapping paper, greeting or gift card paper, notebook covers, artwork, and the like.

Figure 8:
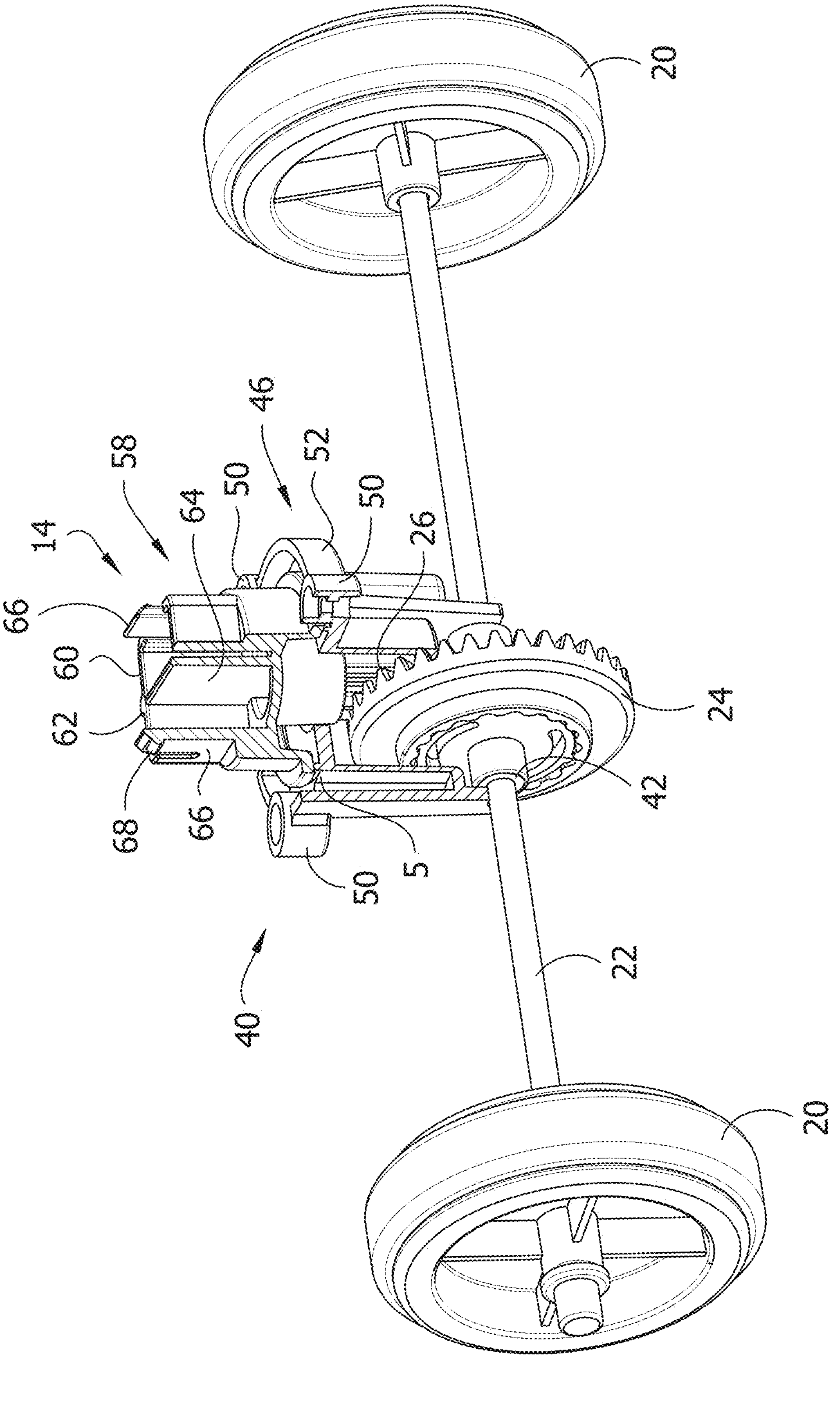
FIG. 8 is a perspective cut-away view of the movement mechanism in combination with the gear assembly of the drawing device of FIG. 1.
Figure 9:
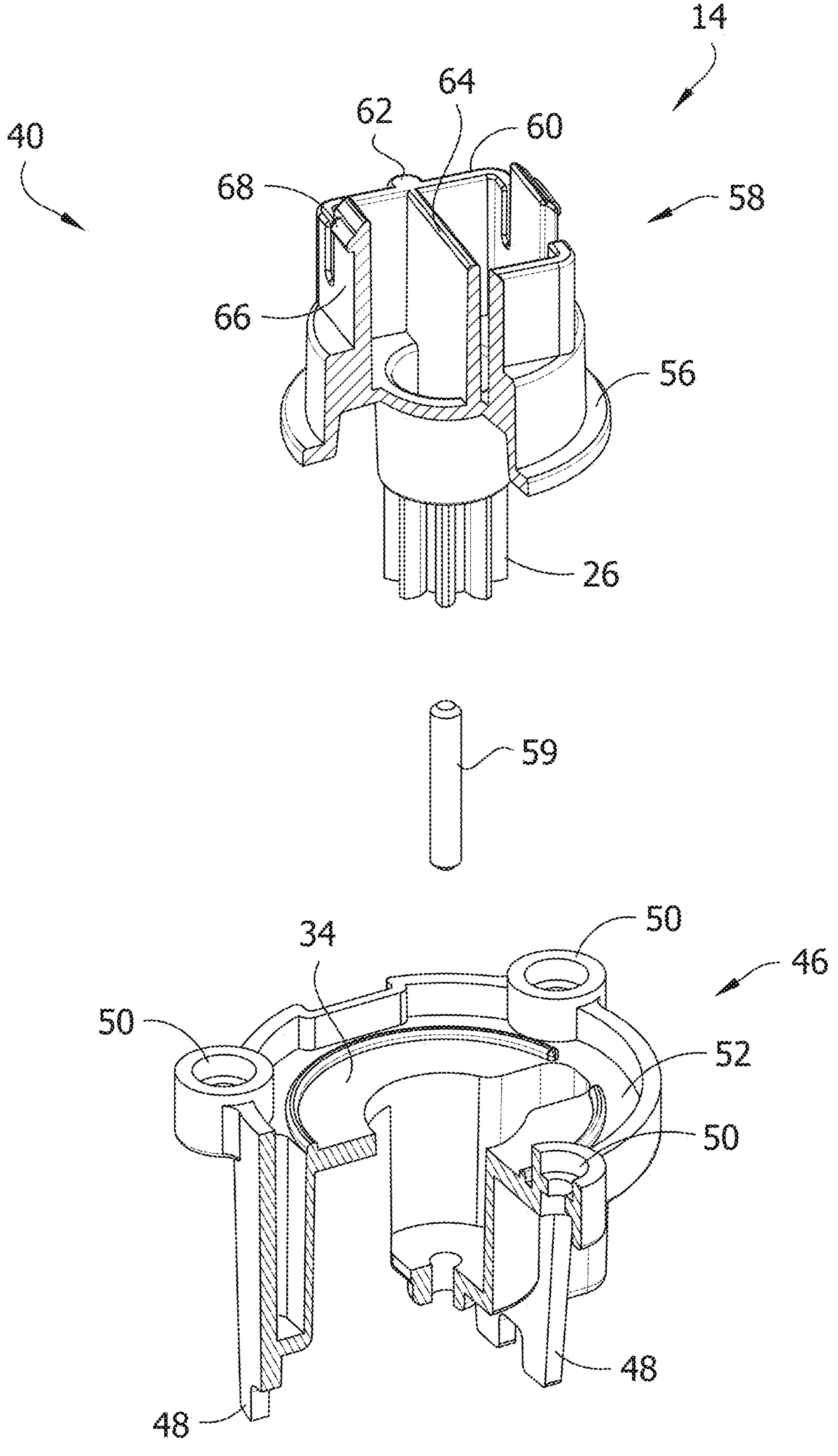
FIG. 9 is an exploded view of the gear mechanism of the drawing device of FIG. 1.
Figure 11:
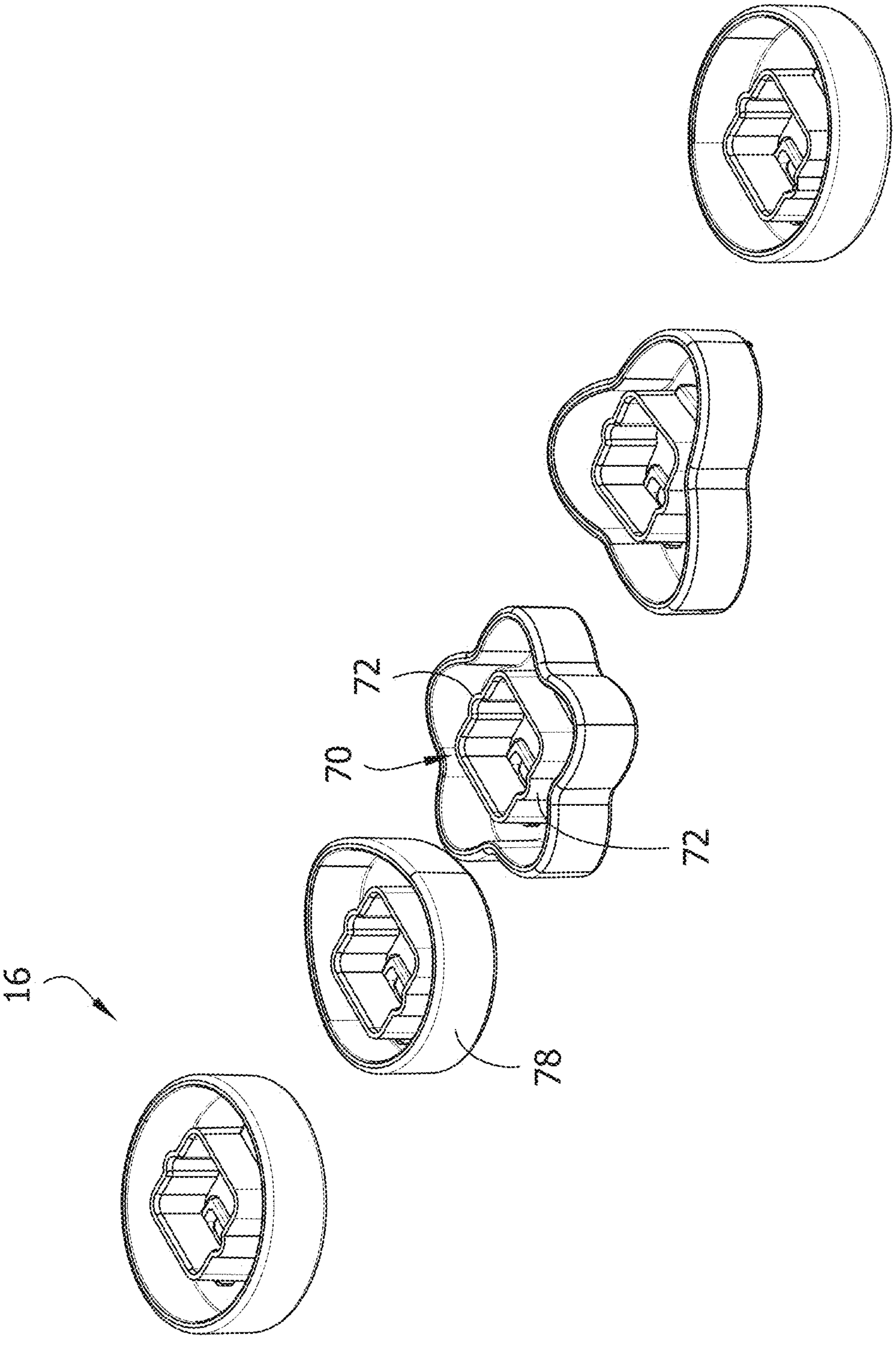
FIG. 11 is a bottom perspective view of the cams of FIG. 10.
Figure 12:
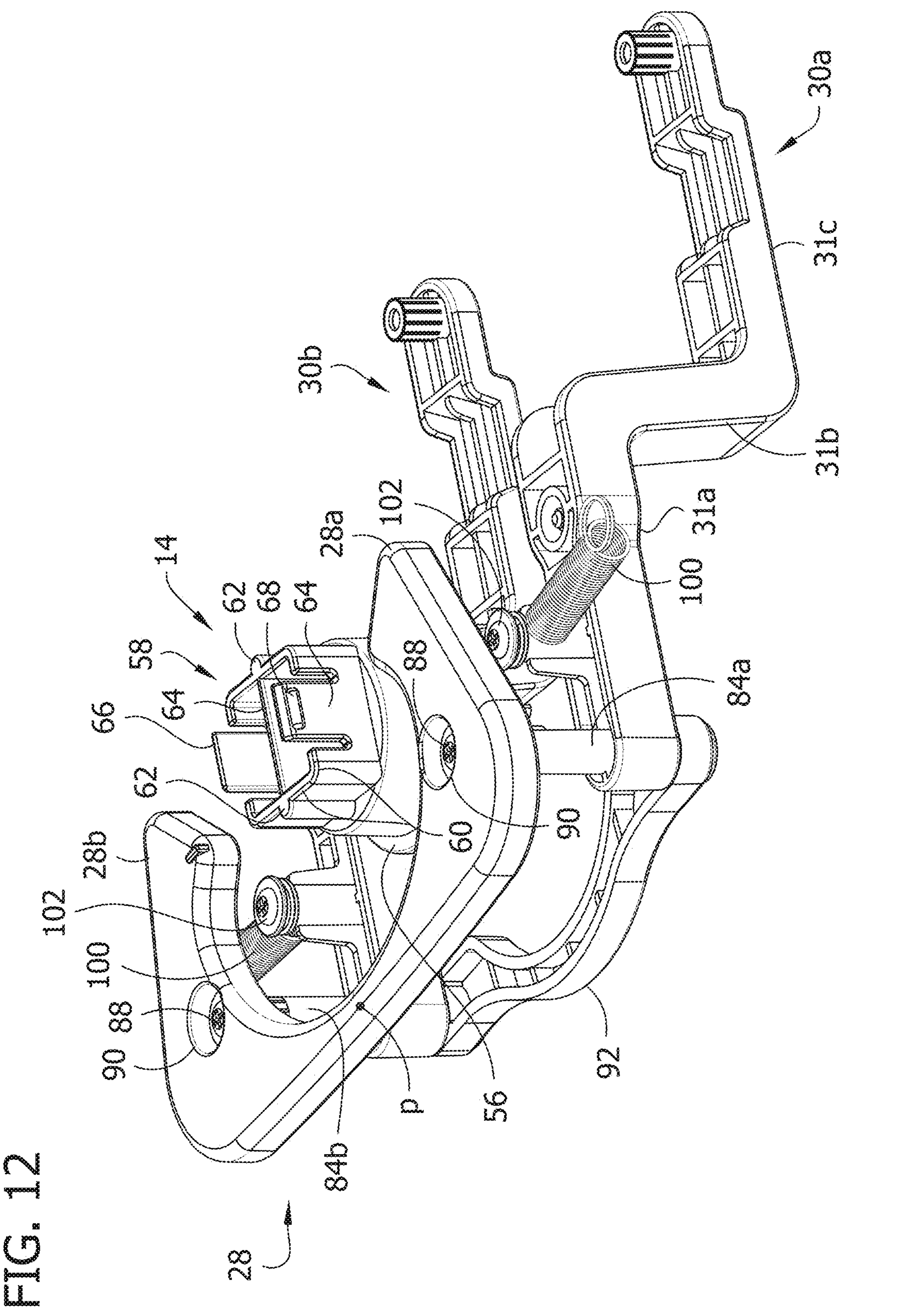
FIG. 12 is a perspective view of the cam follower, cam mount, biasing members, and arms of the drawing device of FIG. 1.
Figure 13:
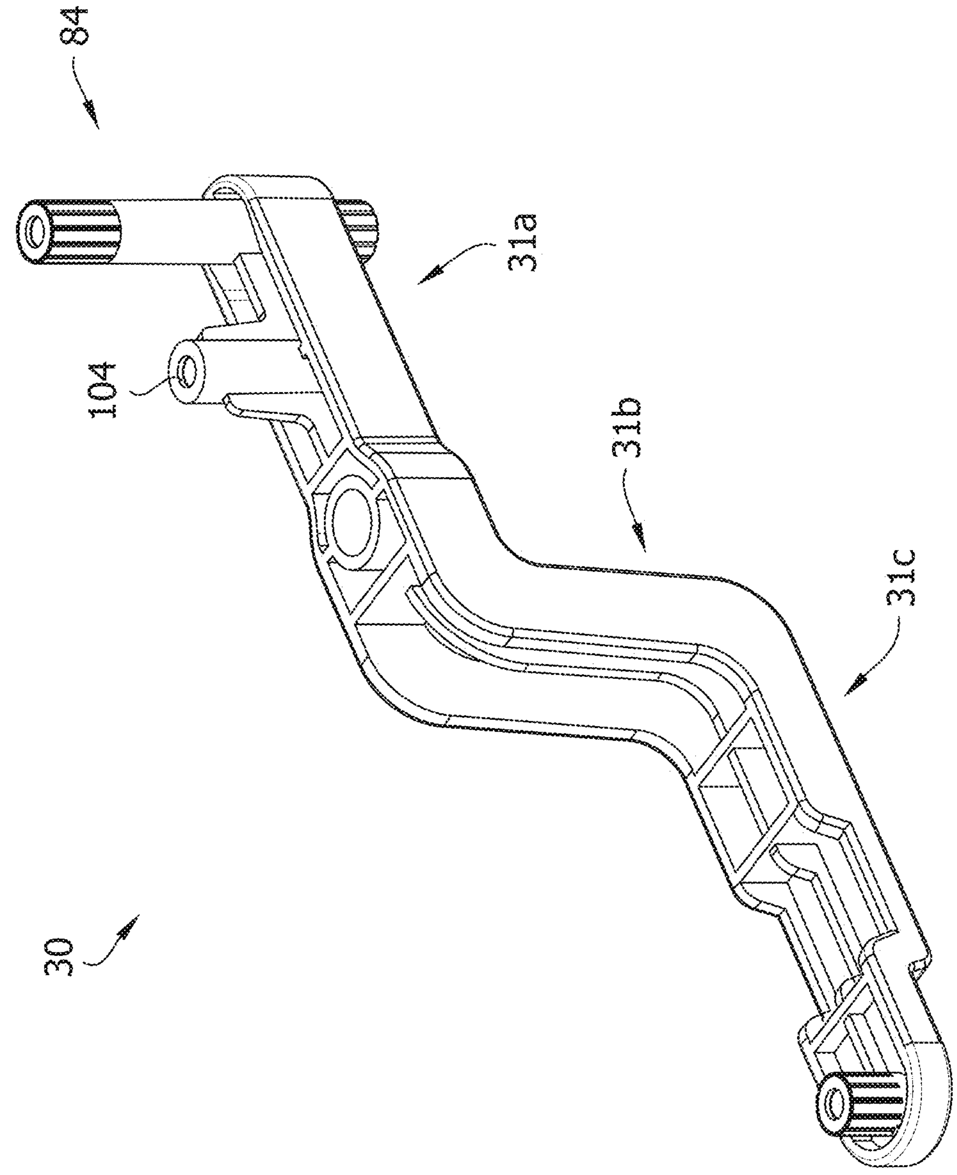
FIG. 13 is a perspective view of an arm of the drawing device of FIG. 1.

One aspect of the present disclosure is directed to a drawing device shown in FIGS. 1-14 and denoted by the numeral 10. Looking to FIGS. 1, 2 and 6, drawing device 10 has a housing 12 that at least partially encloses a cam mount 14 onto which a cam 16 is mounted. Wheels 20 enable longitudinal (forward and rearward) movement of drawing device 10 by a user pushing or pulling on the device. As shown in FIGS. 8 and 9, movement of the device causes wheels 20 and wheel rod 22 to rotate, which in turn, causes gear 24 coupled to wheel rod 22 to rotate. Rotation of gear 24, in turn, rotates worm screw 26, which in turn rotates cam mount 14 and cam 16. As shown in FIGS. 7 and 12, cam 16 contacts cam follower 28, which pivots arms 30. Arms 30 are coupled to marker carriage 32, such that the pivoting movement of arms 30 translates to lateral movement of marker carriage 32.

In various embodiments, housing 12 includes a top portion **12*a* and a bottom portion 12*b* that can be connected via any appropriate fastening mechanism 34** (e.g., fasteners such as screws, snap-fit closure, and the like), although access to the interior of the housing can be provided by a number of ways as will be understood by the skilled person.

Figure 4:
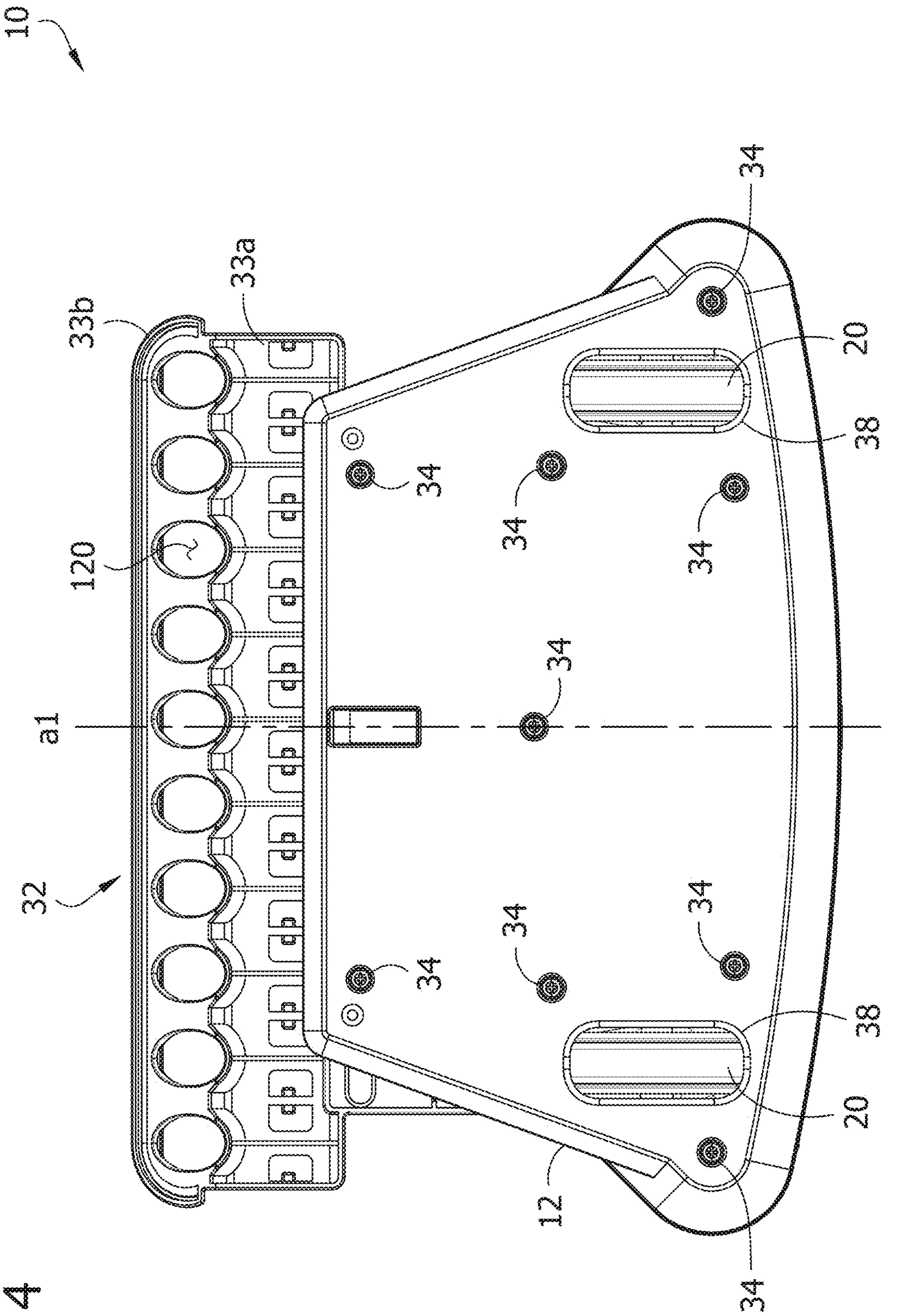
FIG. 4 is a bottom plan view of the drawing device of FIG. 1 without the markers mounted on the device.
Figure 5:
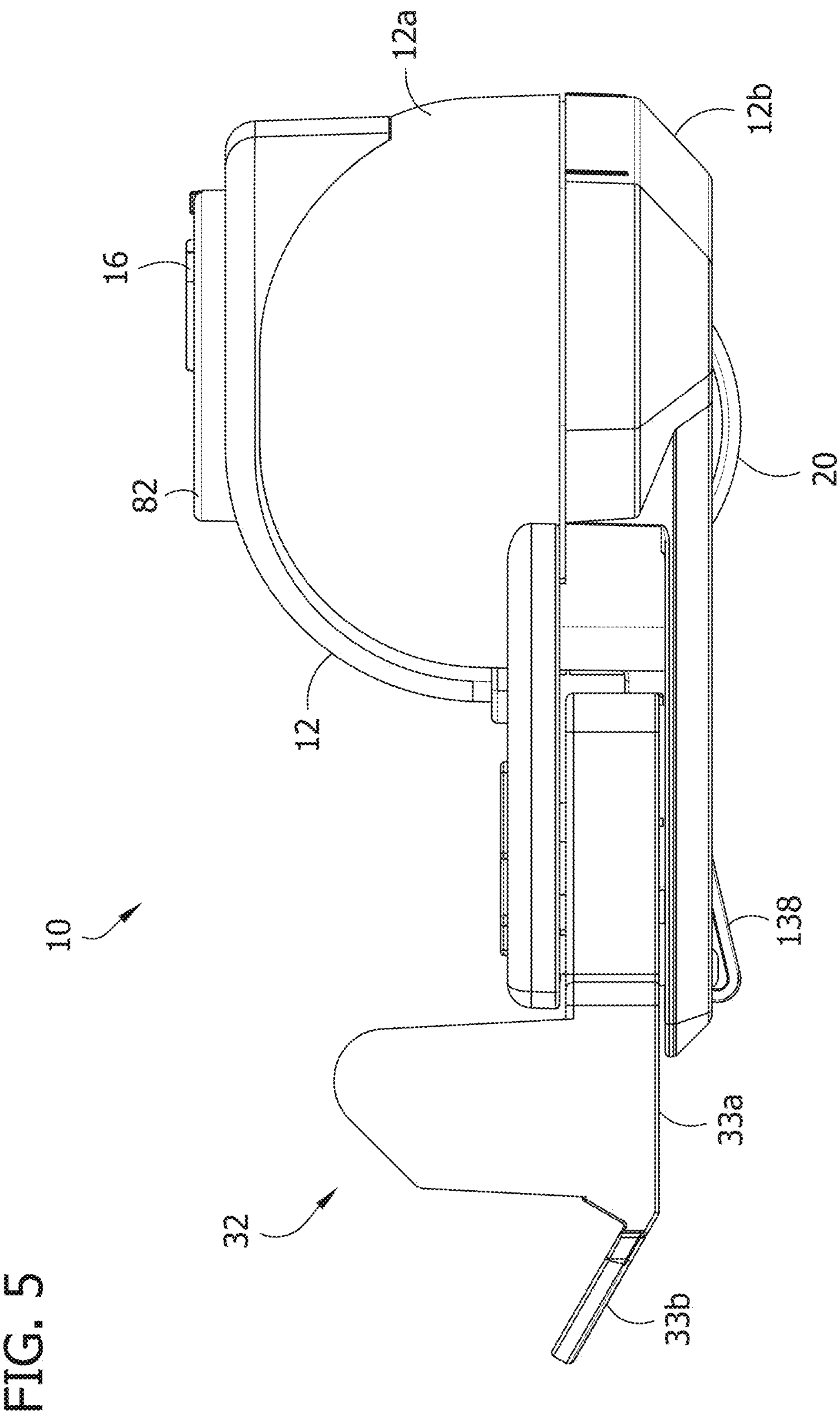
FIG. 5 is a right side plan view of the drawing device of FIG. 1 without the markers but showing the cam mounted on the device.

Housing 12 has a movement mechanism located therein or thereon. In the illustrated embodiment, the movement mechanism includes two wheels 20 that partially extend through two holes 38 (FIG. 4) defined by the bottom portion **12*b* of housing 12 so that they can contact a portion of the intended writing surface or substrate. In general, the movement mechanism allows for low friction contact between the writing surface and the base of the housing 12. For example, the movement mechanism can include at least one wheel (e.g., one wheel, two wheels, three wheels, four wheels, etc.), or any other appropriate device. When at least one wheel is used, it can be coupled to the base of housing or, as illustrated, located partially within the housing 12 and partially extend through the bottom portion of the housing to contact the writing surface. When two wheels are used, as in the illustrated embodiment, the wheels 20 can be evenly spaced from a longitudinal axis al of the drawing device 10 as shown in FIG. 4**.

Looking to FIGS. 7 and 8, the movement mechanism is operatively coupled to a gear assembly 40, for example, by a rod 22 (wheel rod). In the illustrated embodiment having two wheels 20, wheel rod 22 extends from the first wheel to the second wheel through a central portion of the respective wheels. Upon rotation of the wheels, the wheel rod 22 also rotates. A gear 24 is coupled to the wheel rod 22. In the illustrated embodiment, the gear 24 defines a central hole 42 through which the wheel rod 22 extends, and the gear 24 is located at or near a center point of the wheel rod 22.

Referring to FIGS. 8 and 9, the gear assembly 40 also includes a worm screw 26 operatively coupled to the gear 24 (worm wheel). Rotation of the gear 24 through rotation of the wheel rod 22 thereby also rotates the worm screw 26. Worm screw 26 is located on a bottom portion of the cam mount 14. Thus, rotation of worm screw 26 causes rotation of cam mount 14 as a whole. The device 10 also includes a gear holder 46 to aid in the interaction between the gear 24, the worm screw 26 and cam mount 16. The gear holder 46 has two pronged legs 48 that extend toward the wheel rod 22. The cut-out portion creating the prong rests atop the wheel rod 22, wherein one leg 48 is on one side of gear 24 and the other leg 48 is on the other side of gear 24. The gear holder 46 can define openings 50 for insertion of fasteners (not shown) to fasten the gear holder to housing 12. In the illustrated embodiment, the gear holder 46 contains three fastener openings 50 circumferentially spaced around gear holder 46. In general, the gear holder is generally cylindrical in shape with an outwardly extending flange 52 and an inwardly extending flange 54. The inwardly extending flange 54 mates with an outwardly extending flange 56 on the cam mount 14 to allow the cam mount 14 to rest atop the gear holder 46, thereby allowing free rotation of the gear assembly 40 (worm wheel and worm screw). Pin 59 (FIG. 9) can be inserted through an opening defined by gear holder 46 and worm screw 26 to operatively couple to components.

Figure 2:
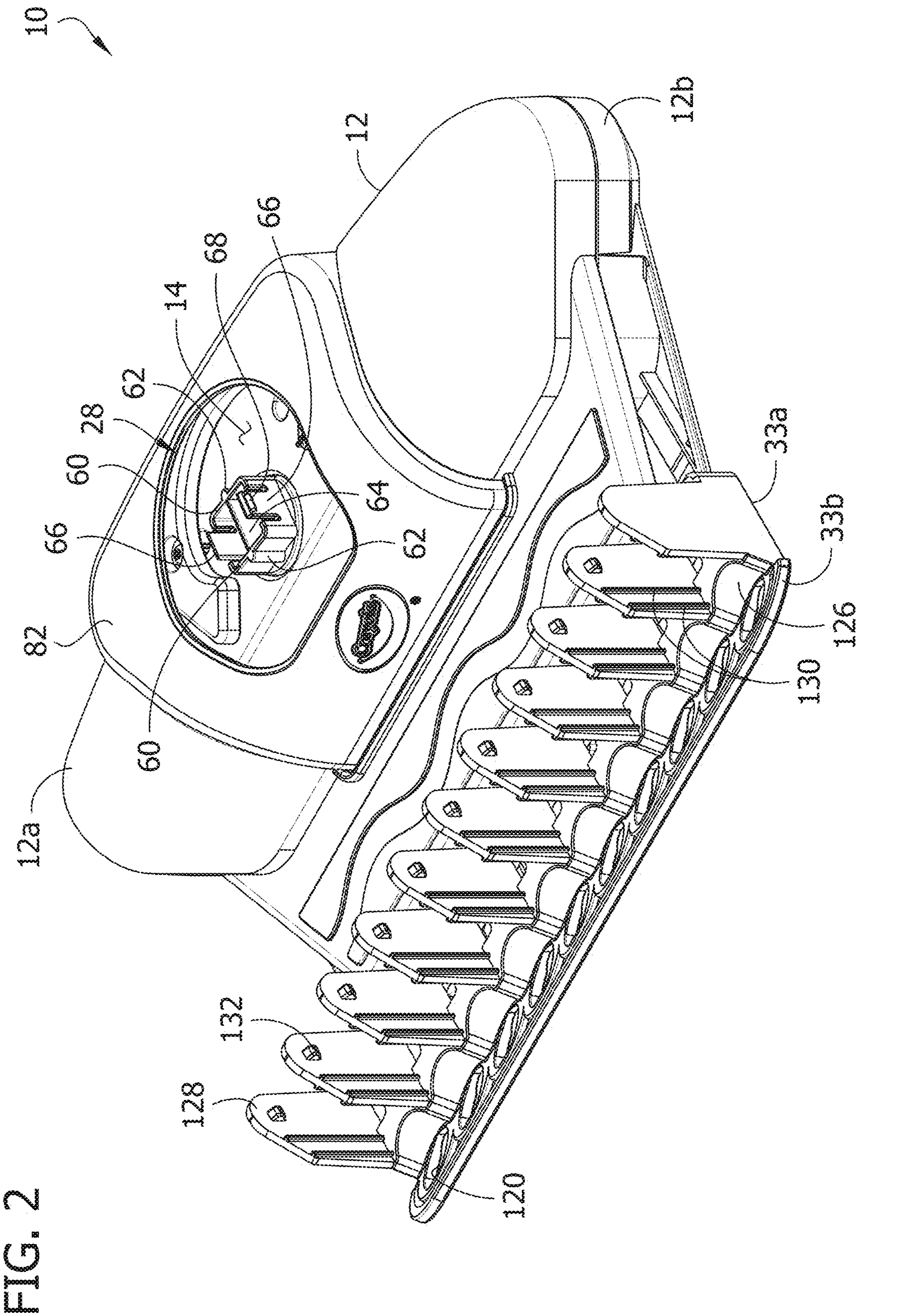
FIG. 2 is a perspective view of the drawing device of FIG. 1 without the markers or cam mounted on the device.

As shown in FIG. 2, cam mount 14 extends upwardly through a central opening in the top housing **12*a* such that a cam 16 selected by the user can be removably mounted on the cam mount. While in the illustrated embodiment, the cam mount is centrally located through the top of housing 12, the skilled person will understand that the cam mount 14 can be located in any appropriate location on or in the housing 12 (e.g., on the top of, bottom of, sides of, or within the housing). The cam mount 14 includes a top mounting portion 58 and a bottom worm screw 26. Thus, rotation of the worm screw 26 by the gear 24 propelled by the movement of the wheels 20 along a surface correspondingly causes rotation of the top mounting portion 58 of the cam mount 14**.

Figure 10:
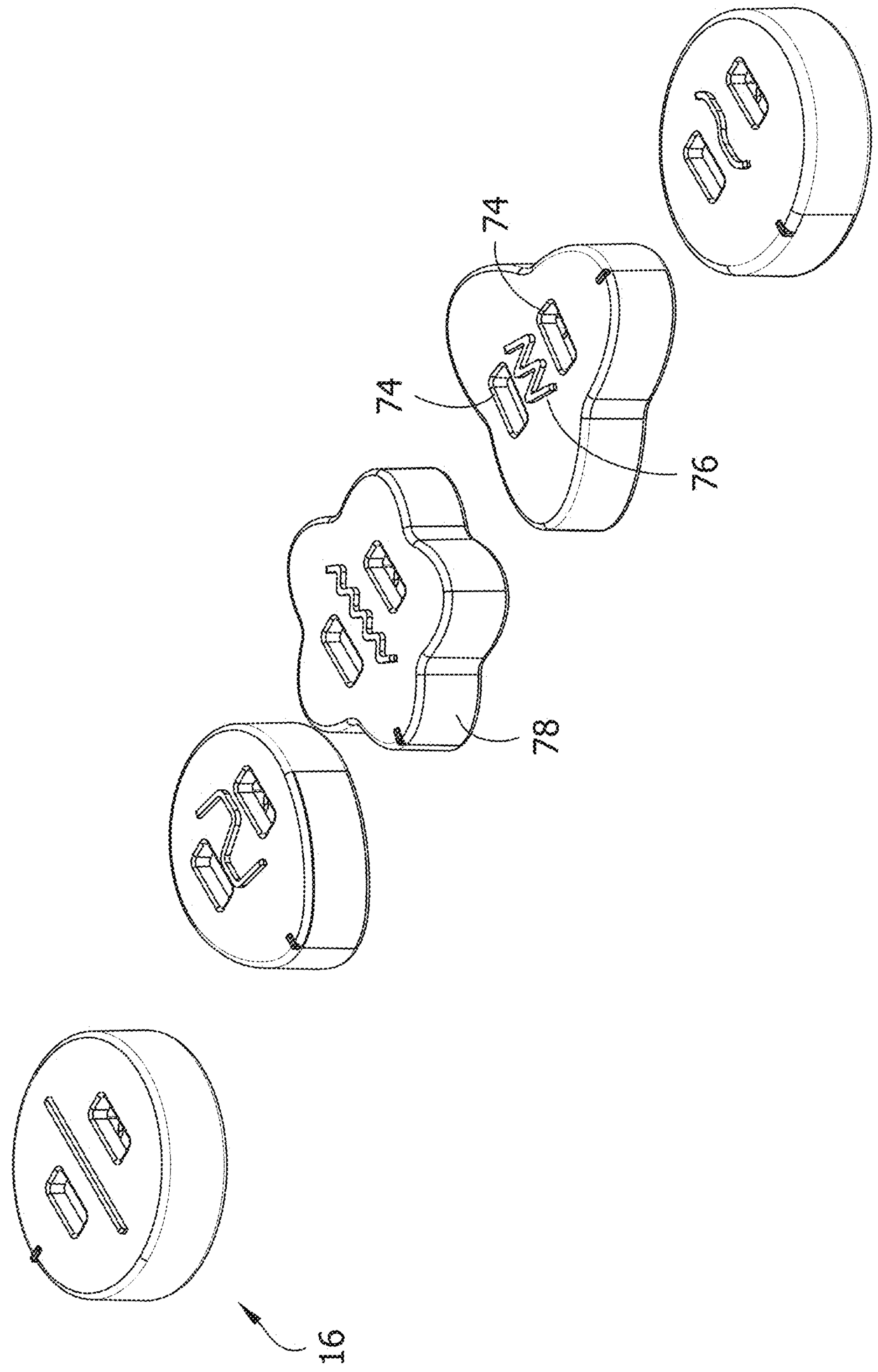
FIG. 10 is a top perspective view of five different cams for use with the drawing device of FIG. 1.

The mounting portion 58 has four upwardly extending sides 60. Two opposing sides contain ribs 62. In the illustrated embodiment, these sides 60 are supported via a support wall 64 to strengthen the cam mount 14 from one rib 62 to the other rib 62. The other two opposing sides contain a central tab 66, wherein the tab 66 is resiliently deflectable. The central tab 66 contains a detent 68 to secure the cam 16 to the cam mount 14. Thus, the mounting portion 58 generally resembles a protruding square having four perpendicular sides. Referring to FIGS. 10 and 11, the underside of the cam 16 mimics this structure, having an analogous recessed portion 70 having the same general shape as the protruding mounting portion 58. Thus, two opposing sides of the recessed square contain outward bulges 72 that mate with the outwardly projecting ribs 62 of the mounting portion 58 of the cam mount 14. The top wall of the cam 16 defines two openings 74 on the inner side of the two other opposing side walls corresponding to the deflectable tabs 66 of the cam mount 14. The deflectable tabs 66 mate with these openings 74 to releasably couple the cam 16 to the cam mount 14.

As shown in FIGS. 10 and 11, the cam 16 can be any desired shape and a variety of different shapes of cams may be provided for use with the drawing device to make different patterns. As discussed more fully below, the shape of the cam dictates the translational movement of the marker carriage 32. That is, the shape of the cam dictates the overall pattern made upon movement of the device 10. As illustrated, the cam can also include a peripheral skirt 78 that contacts the internal walls of the cam follower 28.

Figure 3:
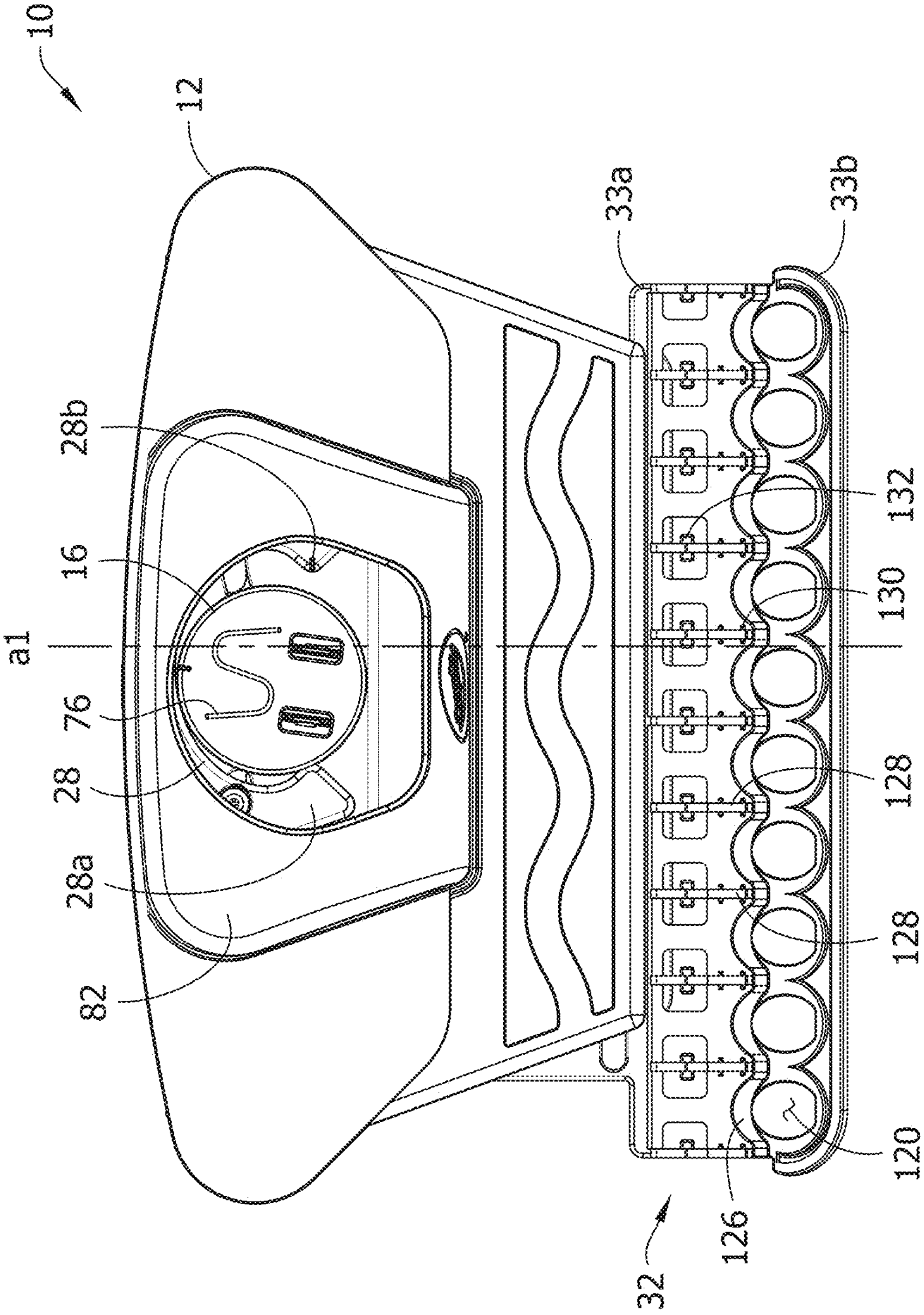
FIG. 3 is a top plan view of the drawing device of FIG. 1 without the markers but showing the cam mounted on the device.

As best shown in FIGS. 3 and 12, a collar shaped cam follower 28 is positioned adjacent cam mount 14 and cam 16 for contact with cam 16 upon movement of the drawing device. Cam follower 28 has an arcuate shape so that one end 28*a* of the cam follower is located to one side of the cam mount (e.g., left side) and the other end 28*b* of the cam follower is located to the other side of the cam mount 14, opposing the other end of the cam follower (e.g., right side). Cam follower 28 is coupled to housing at a pivot point p such that cam follower 28 pivots upon contact of the cam 16 with the cam follower 28. The top side of the housing 12*a* can also contain a cam frame 82 (FIGS. 2 and 3) to generally hide the cam follower from view of the user.

Figure 6:
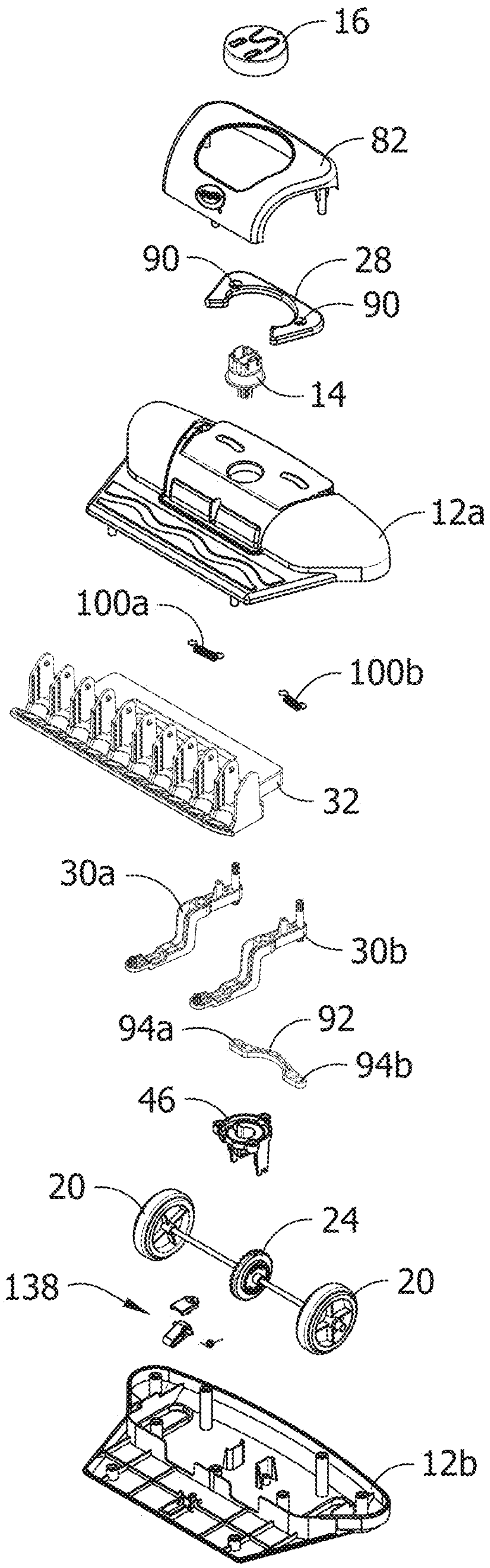
FIG. 6 is an exploded view of the drawing device of FIG. 1 without the markers but showing the cam.
Figure 7:
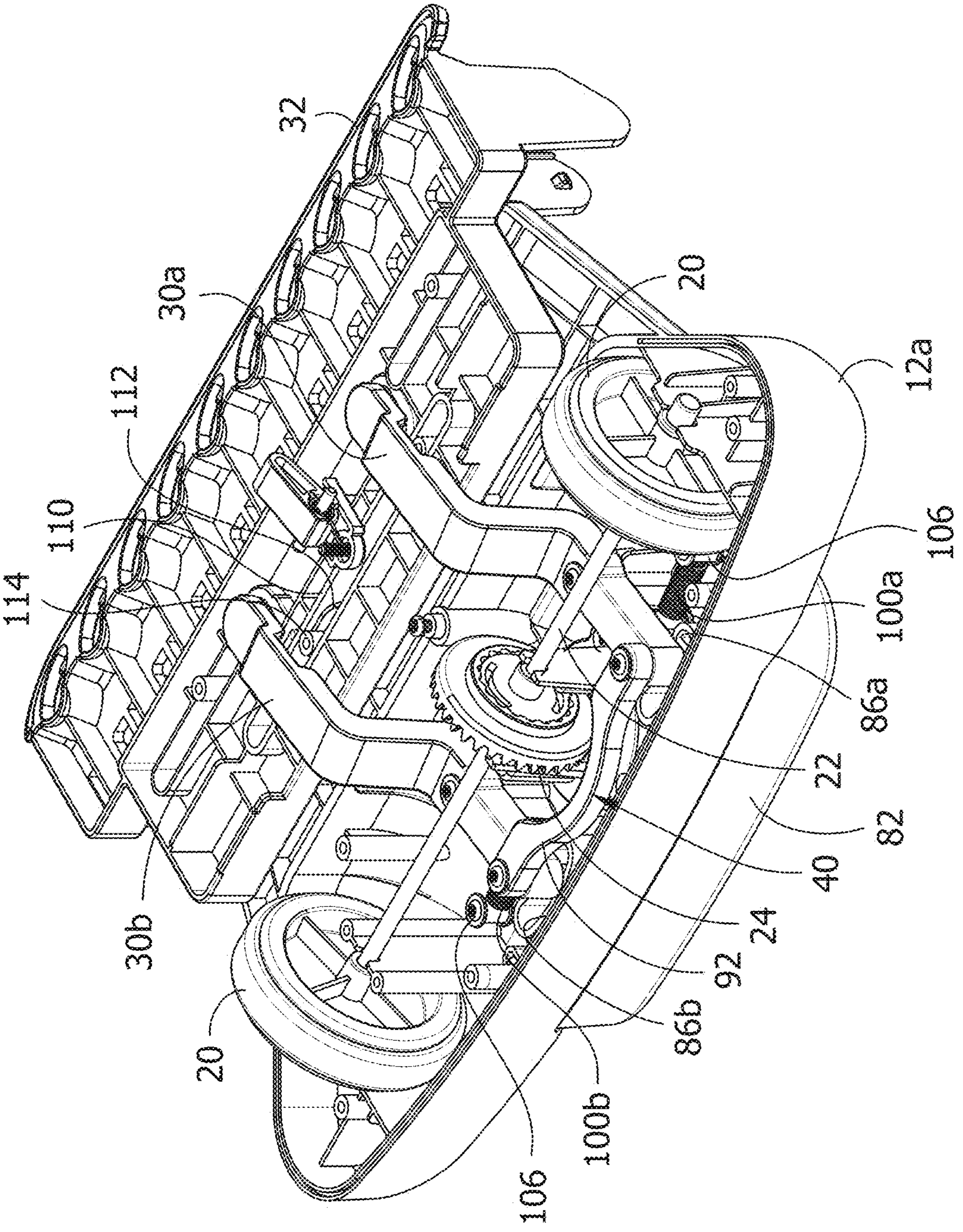
FIG. 7 is a perspective view of the bottom of the drawing device of FIG. 1 with the bottom side of the housing removed.

Looking to FIGS. 6, 7 and 12, cam follower 28 is operatively coupled to arms 30(*a*)(*b*) via corresponding linkages 84(*a*)(*b*). Linkages 84(*a*)(*b*) are coupled to cam follower 28 through corresponding fastener openings 90(*a*)(*b*) defined by cam follower as well as arcuate openings 86(*a*)(*b*) (FIG. 14) in housing 12. Arcuate openings 86 are sized to allow for the pivoting movement of the cam follower 28 to be mimicked by the linkage 84. A fastener 88 can be inserted into the cam follower fastener opening 90 and threaded into a fastener hole defined by linkage 84 thereby coupling cam follower 28 to linkage 84. The skilled person will understand that cam follower 28 can be coupled to linkage 84 in other appropriate manners. Cam follower 28 (and linkage 84) may be coupled to arms 30 at a number of locations. In the illustrated embodiment, both the first end of the cam follower 80*a* and the second end of the cam follower 80*b* define a fastener opening 90 coupled to a first linkage and a second linkage. Alternatively, the cam follower 28 can define at least one fastener opening (for example, one fastener opening, two fastener opening, three fastener openings, four fastener openings, etc.) with a fastener inserted therethrough and coupled to a linkage at any appropriate location.

Linkages 84(*a*)(*b*) are operatively coupled to arms 30(*a*)(*b*). Linkages 84 can be coupled to arms 30 through fastener holes defined by arms 30. A fastener can be inserted into each arm 30 and threaded into a fastener hole defined by each linkage 84, thereby coupling arms 30 to linkages 84. Alternatively, linkages 84(*a*)(*b*) may be integrally formed with arms 30(*a*)(*b*). The skilled person will understand that arm 30 can be coupled to linkage 84 in other appropriate manners. The illustrated embodiment contains an arm 30 at each linkage 84. Arms 30 are connected to each other via stability leg 92 to provide added stability, although the skilled person will understand that added stability may not be necessary, or can be provided in a variety of other manners. The stability leg 92 defines fastener openings 94(*a*)(*b*) that correspond to the fastener openings defined by arms 30. Thus, when a fastener is placed through an end of the stability leg 92, an arm 30 and linkage 84, it couples these three components together.

In various embodiments, the drawing device 10 may include more than one cam follower operatively connected to arms 30. A second cam follower can be located, for example, on the top and bottom of cam mount, so that there is a cam follower on each of the top, bottom, left, and right of cam mount. In embodiments having a first cam follower and a second cam follower, the first cam follower can create side-to-side movement of a marker holding assembly, and the second cam follower can create front-to-back movement of the marker holding assembly. Alternatively, a first cam follower can be located to one side of the cam mount (e.g., left side) and a second cam follower can be located to the other side of the cam mount, opposing the first cam follower (e.g., right side). In various embodiments, the device can also comprise a third cam follower located approximately 90 degrees from and general planar to the first and second cam follower (e.g., on the top side of cam mount) and a fourth cam follower opposing the third cam follower (e.g., on the bottom side of the cam mount).

In various embodiments, and referring in particular to FIGS. 7 and 12, biasing members 100(*a*)(*b*) can couple corresponding arms 30(*a*)(*b*) to housing 12. In the illustrated embodiment, an end of a biasing member 100 (e.g., spring) is coupled to one of the arms 30 via a fastener 102 through a biasing member fastener hole 104 (FIG. 13) defined by arm 30. The other end of the biasing member 100 (e.g., spring) is coupled to a post 106 in housing 12 via a fastener. The biasing members 100 allow the arms 30 to return to a neutral (starting) position after a pivoting movement caused by movement of the cam follower 28.

Figure 14:
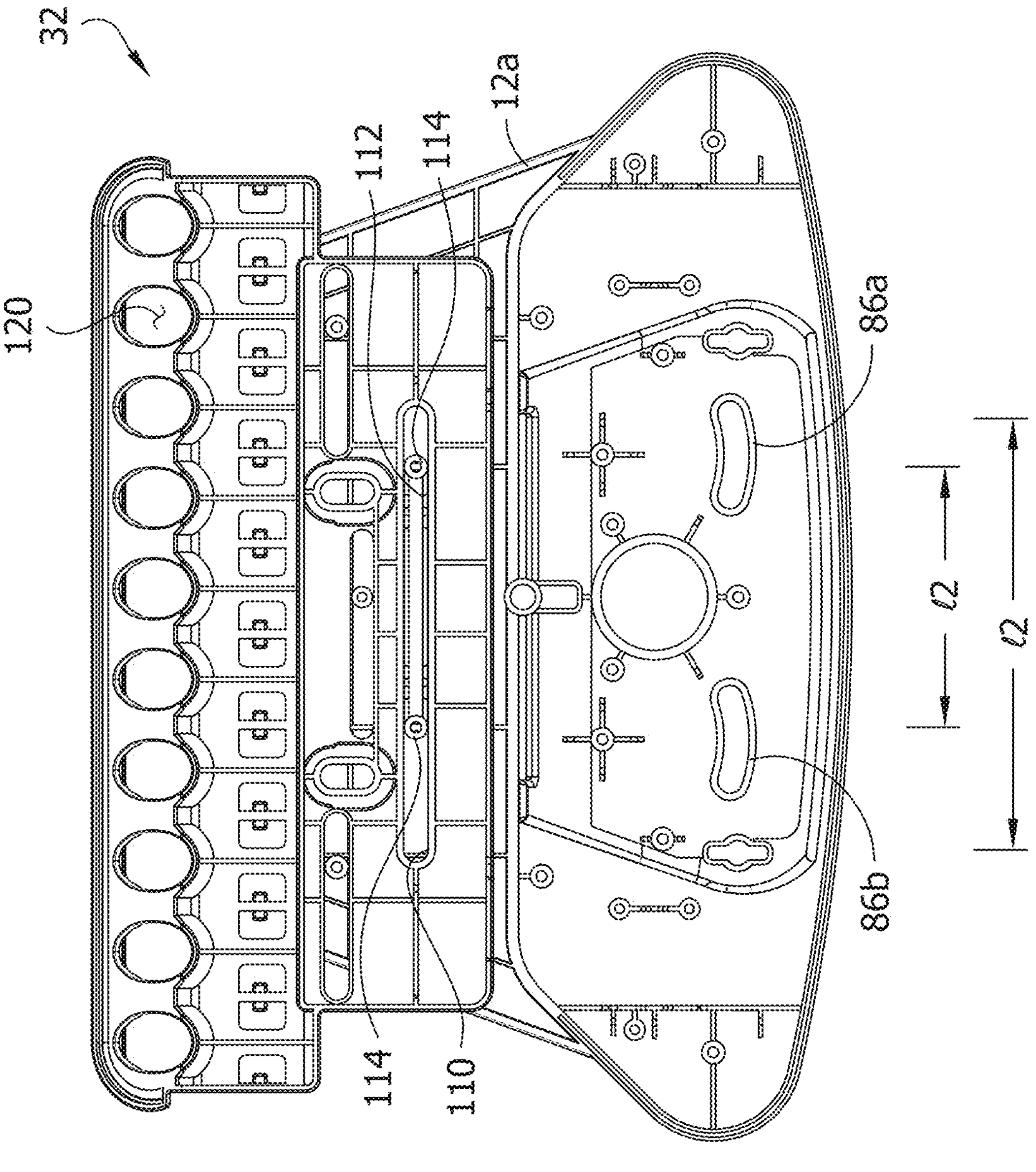
FIG. 14 is a bottom plan view of the top portion of the housing and the marker carriage of the drawing device of FIG. 1.

In the illustrated embodiment, and referring in particular to FIG. 14, each arm 30 contains three distinct portions. A first portion 31*a* of the arm is generally located in an upper portion of the housing 12 above the wheel rod 22 and is generally planar and parallel to the longitudinal axis al of the drawing device 10. A second portion 31*b* of the arm 30 extends perpendicularly downward toward the bottom of housing 12 and terminates below wheel rod 22. A third portion 31*c* of the arm 30 extends parallel to and in the same direction as the first portion 31*a* and below the wheel rod 22 and couples the arms 30 to the marker carriage 32. The arms 30 can be coupled to the marker carriage 32 through any known means in the art, for example, using fasteners placed through fasteners holes defined by the marker carriage 32 and the arms 30.

Looking to FIG. 14, the marker carriage 32 contains an elongated slot 110 located thereon that mates with a protrusion 112 having two fastener holes 114 defined on either side thereof protruding downward from the top portion 12*a* of the housing 12. The elongated slot 110 is wide enough to allow the protrusion 112 to pass therethrough but not allow passage of the heads of any screw inserted into the fastener hole, thereby securing the marker carriage to the housing. The elongated slot has a length l1 greater than the length l2 of the housing protrusion. The difference in length allows for lateral side-to-side movement of the marker carriage upon pivoting of the arms from the cam follower movement and cam rotation.

The marker carriage 32 has a first portion 33*a* and a second portion 33*b*. The first portion 33*a* can be partially or completely enclosed within housing 12. The first portion 33*a* is generally co-axial with the housing 12 (e.g., the base of housing). The second portion 33*b* of the marker carriage 32 is generally angled relative to the first portion of carriage 33*a*. For example, the second portion can be angled about 145 degrees to about 155 degrees (e.g., 150 degrees) relative to the first portion and to the housing. In other embodiments, the second portion 33*b* is co-axial with the first portion 33*a*. The degree of angle of the second portion may dictate the relative line thickness of the markings produced upon movement of the drawing device 10, especially when a marker having a bullet nib is used. For example, a second portion that is not angled or not substantially angled relative to the first portion will produce a thinner line as compared to a second portion that is angled at least 45 degrees relative to the first portion.

The second portion 33*b* of marker carriage 32 defines at least one opening 120. The opening 120 is sized to receive a marker or other writing instrument as intended. For example, the opening 120 can be sized to receive a broad line marker, a fine line marker, or a super fine line marker, a crayon, a pen, a pencil, or any other appropriate writing instrument. In embodiments where the opening is sized to receive a marker, the opening is generally sized to allow the nib of the marker to pass through while not allowing the barrel of the marker to pass. In various embodiments, the opening can be universally sized to receive a variety of different writing instruments. In other embodiments, the opening can be sized to receive a particular writing instrument. In various aspects, the opening may be sized and shaped to provide a snap fit with the top of the marker barrel.

Marker carriage 32 can define more than one opening 120, for example, two openings, three openings, four openings, five openings, six openings, seven openings, eight openings, nine openings, ten openings, or more. The number of openings for writing instruments can be increased through an expansion member having additional openings located thereon that can be coupled to the body of the marker holding assembly. The illustrated embodiment defines ten openings 120 for engagement of ten different markers.

In various embodiments, first portion 33*a* is offset from second portion 33*b* by ledge 126. The barrel of the marker or other writing instrument rests on ledge 126 to provide stability to the writing instrument. The ledge 126 can be sized and shaped to correspond to the size and shape of the barrel of the writing instrument in order to essentially cradle the barrel during use. An upwardly extending wall 128 is positioned on either side of each opening 120 in the marker carriage 30 to provide added stability to the writing instrument once inserted. The spacing between walls 128 can be such that the distance between adjacent walls 128 is substantially equal to or only slightly larger than that of the writing instrument intended to be used in the marker carriage. For example, when the openings 120 are sized for use with a broad line marker, the distance between adjacent walls 128 is generally about the diameter of the barrel of a broad line marker, such that the outer surface of the barrel of the marker (or other writing instrument) is in abutting engagement (contact with) the walls on either side of the opening through which the marker is inserted. The walls 128 can also contain upwardly extending ribs 130 and/or nibs 132 along a portion thereof in order to increase contact with the inserted writing instrument. In the illustrated embodiment, two ribs 130 are located on a front portion of the wall 128 on each marker-contacting surface and a nib 132 is located on a top rear portion of the wall 128 on each marker-contacting surface. The walls 128 are generally trapezoidal in shape, having a flat bottom side, generally perpendicular front and back sides, wherein the back side is taller than (extends more upward than) the front side. A top side connects the back side to the front side and is generally angled due to the disparity in side lengths of the back side and the front side.

The carriage 32 can comprise an adapter (not shown) that is coupled to the opening (for example, through a snap fit or mating mechanism) so that the opening is sized to receive a writing instrument of a different size. For example, the openings can be sized to receive a broad line marker (or any other desired writing instrument), or upon engagement of the adapter, a fine line marker (or any other desired writing instrument). Different adapters can be used to change the size of the opening. For example, one adapter can change the size of the opening to receive a fine line marker. A second adapter can the size of the opening to receive a crayon, and so forth. The adapter can have a component that also adapts the wall spacing to allow for abutting engagement of different sized writing instruments with the walls. For example, the adapter can have walls connected thereto that extend relatively upward to engage a writing instrument barrel inserted therein. Alternatively, the wall spacing adapter can be a separate component. For example, a wall spacing adapter can be coupled to existing walls independently (e.g., through snap fit, mating components, etc.).

Looking to FIG. 4, a deployable positioning wheel 128 can be located on the base of housing 12. The positioning wheel 128 is movable (retractable) from a first deployed position to a depressed position. In the first position, the positioning wheel 128 elevates the housing 12 by raising a portion of housing 12 (e.g., tilting housing near the marker holding assembly) to allow markers or other writing instruments to be inserted into the marker carriage 32 without unintentional markings on the writing surface. In use, the positioning wheel 128 is pushed into a retracted position, thereby moving the writing instruments into contact with the writing surface. The positioning wheel 128 also provides a third wheel surface for added stability of the device 10 while moving.

In another embodiment, a retractable spacer (not shown) can be used in place of or in addition to the positioning wheel. In this way, the spacer can be deployed so that it elevates housing by raising at least a portion of housing to allow markers or other writing instruments to be inserted into the marker carriage. The retractable spacer can be retracted, for example by moving the spacer so that it is generally flush with the base of housing or in a position so as not to cause interference between the retractable spacer and the writing surface.

In use, a user inserts a desired cam (using the pattern indicia located thereon to determine the pattern) into the cam mount. The user inserts the desired writing instruments into the openings defined by the marker carriage. The user then pushes the device across a substrate to create a design. That is, the movement of the device causes the writing instrument to create a line (a patterned line) across the surface of the substrate. By moving the device, the wheels rotate, causing the wheel rod to rotate. The rotation of the wheel rod rotates the gear assembly (the gear and the worm screw) to thereby cause rotation of the cam and the cam mount. The rotation of the cam causes intermittent contact of the cam with the cam follower (e.g., the left side and/or right side of the cam follower on an intermittent basis). The cam follower movement causes the arms of the device to pivot, which thereby translationally moves the marker carriage. The marker carriage movement causes the lines created on the substrate from the writing instrument to one side of center. The particular shape of the cam will dictate the pattern. For example, a cam having more contact surfaces for contact with the cam follower, evenly distributed across the perimeter of the cam will cause rapid side-to-side movement of the marker carriage due to the rapid contact of the cam with the left and right sides of the cam follower. This shape of cam may create, for example, a large (high-amplitude) high-frequency zig-zag pattern. When the protrusions on the cam perimeter are reduced, but the same general shape is used, a smaller (low-amplitude) high-frequency zig-zag pattern may be created. Thus, the fewer protrusions present on the circumference of the cam will cause less translational movement of the markers during the creation of the pattern (a lower frequency pattern), and more protrusions will cause more translational movement (a higher frequency pattern). Similarly, the larger the distance from the main cam body to the end of the protrusion (i.e., a cam having larger protrusions), the larger the amplitude of the created pattern, and the smaller the distance, the smaller the amplitude of the created pattern. For example, a centered circle will produce a relatively straight line as it does not contact the cam follower(s), whereas an off-centered circle (having one cam protrusion) will produce a wavy line and a star shape will produce a zig-zag line. Pattern indicia 76 (FIG. 10) located on the cam 16 indicate the pattern that will be produced by that particular cam 16. The pattern indicia 76 can include a raised example of the pattern. For example, a triangular cam having side indents includes a high-amplitude zig-zag pattern raised on the top side of the cam. A star-shaped came includes a low-amplitude zig-zag pattern raised on the top side of the cam.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A drawing device comprising:

at least one wheel coupled to a wheel rod having a gear assembly located thereon, wherein movement of the wheel causes rotation of the gear assembly;

a cam operatively coupled to the gear assembly such that rotation of the gear assembly causes rotation of the cam, wherein the cam has at least one bearing surface that defines a pattern to be drawn by the drawing device, the bearing surface configured to intermittently engage a cam follower upon rotation of the cam;

at least one arm operatively coupled to the cam follower, wherein the at least one arm is configured to pivot upon engagement of the cam with the cam follower;

a marker carriage operatively coupled to the at least one arm, wherein the marker carriage defines at least one marker opening sized and shaped to receive a writing instrument, and wherein the marker carriage is configured to laterally move upon pivoting of the at least one arm in the pattern defined by the bearing surface.

2. The device of claim 1, further comprising a cam mount, wherein the cam mount is operatively coupled to the gear assembly such that rotation of the gear assembly causes rotation of the cam mount, and wherein the cam is releasably coupled to the cam mount.

3. The device of claim 2, wherein the cam mount comprises a shaped protrusion on a surface thereof and the cam comprises a recessed portion corresponding in shape to the cam mount protrusion, such that the recessed portion of the cam mates with the cam mount protrusion.

4. The device of claim 3, wherein the cam follower is collar shaped with an arcuate surface extending adjacent and surrounding at least a portion the cam.

5. The device of claim 1, wherein the cam comprises pattern indicia located thereon configured to identify the pattern defined by said cam during use of the device.

6. The device of claim 1, wherein the gear assembly comprises a gear and a worm screw, wherein the gear defines a central opening thereon through which the wheel rod is inserted.

7. The device of claim 6, wherein the gear assembly further comprises a gear holder having an inwardly extending flange, and wherein the cam mount comprises an outwardly extending flange that rests atop the inwardly extending flange of the gear holder.

8. The device of claim 1, further comprising a housing to house the gear assembly, the at least one arm, and at least a portion of the marker carriage.

9. The device of claim 8, wherein the marker carriage comprises a first part coupled to the at least one arm and a second part extending from the first part, the second part of the marker carriage defining the at least one marker opening, wherein the first part is co-axial with a longitudinal axis of the device, and wherein the second part is angled with respect to the first part.

10. The device of claim 9, wherein the second part is angled from about 145 degrees to about 155 degrees with respect to the first part.

11. The device of claim 9, wherein the first part of the marker carriage defines an elongated slot, wherein the housing comprises an elongated protrusion extending into the slot, wherein the elongated protrusion defines at least one fastener hole, and wherein the elongated slot has a width configured to allow passage of part of a fastener into the fastener hole of the elongated protrusion, while not allowing passage of the other part of the fastener.

12. The device of claim 11, wherein the elongated slot has a length larger than the length of the elongated protrusion, thereby allowing side-to-side movement of the marker carriage.

13. The device of claim 9, wherein the first part and the second part of the marker carriage are offset by a ledge that is sized and shaped to at least partially cradle a barrel of a writing instrument inserted into the at least one marker opening.

14. The device of claim 8, wherein the housing defines at least one arcuate slot through which at least one linkage extends, wherein one end of the at least one linkage is coupled to or integrally formed with the at least one arm, and wherein the other end of the at least one linkage is coupled to the cam follower.

15. The device of claim 8, wherein an underside of the housing contains a deployable positioning wheel, such that when in a first position, the positioning wheel elevates a portion of the housing off of the substrate to allow insertion of a writing instrument into the marker opening without unintentional markings, and when in a second position, the positioning wheel is depressed to allow contact of the writing instrument with the substrate.

16. The device of claim 1, wherein an upwardly extending wall is positioned on either side of the at least one marker opening, the wall configured to provide stability to the inserted writing instrument.

17. The device of claim 1, further comprising at least one biasing member coupled to the at least one arm, wherein the at least one biasing member is configured to return the at least one arm to a neutral position after movement caused by the cam follower.

18. The device of claim 1, wherein the at least one arm comprises two arms, and wherein the two arms are coupled by a stability leg.

19. A kit comprising the drawing device of claim 1, at least two cams, and at least one writing instrument, wherein the at least two cams each have a bearing surface configured to define a pattern to be drawn by the drawing device and wherein the bearing surface of the first cam is different from the bearing surface of the second cam to define two different patterns.

20. A method of creating a pattern on a substrate, the method comprising:

inserting at least one writing instrument into a marker carriage of a drawing device;

coupling a cam to the drawing device;

pushing the device across the substrate, wherein the device comprises at least one wheel coupled to a wheel rod, and the pushing causes the at least one wheel and the wheel rod to rotate;

wherein the device comprises a gear assembly and rotation of the at least one wheel causes rotation of the gear assembly; wherein the gear assembly is operatively coupled to the cam, such that rotation of the gear assembly causes rotation of the cam;

wherein the cam has at least one bearing surface configured to intermittently bear against a cam follower upon rotation of the cam;

wherein the device further comprises at least one arm operatively coupled to the cam follower, wherein the at least one arm is configured to pivot upon engagement of the cam with the cam follower; and wherein the marker carriage is operatively coupled to the at least one arm and the marker carriage is configured to laterally move upon pivoting of the at least one arm.

* * * * *